Nov. 24, 1931.  P. HEDSTROM  1,833,288
PARKING DEVICE FOR AUTOMOBILES
Filed Feb. 18, 1929   2 Sheets-Sheet 1

INVENTOR.
PETER HEDSTROM
BY Munn + Co.
ATTORNEYS.

Nov. 24, 1931. P. HEDSTROM 1,833,288
PARKING DEVICE FOR AUTOMOBILES
Filed Feb. 18, 1929 2 Sheets-Sheet 2

INVENTOR.
PETER HEDSTROM.
BY Munn + Co.
ATTORNEYS.

180. MOTOR VEHICLES

Patented Nov. 24, 1931

1,833,288

UNITED STATES PATENT OFFICE

PETER HEDSTROM, OF PORTLAND, OREGON

PARKING DEVICE FOR AUTOMOBILES

Application filed February 18, 1929. Serial No. 340,980.

My invention relates to improvements in parking devices for automobiles, and it consists in the combinations, constructions and arrangements hereinafter described and claimed.

An object of my invention is to provide a parking device for automobiles that forms a permanent attachment to the vehicle and which is designed to get its power from the engine. The device consists of two transversely-disposed wheel segments, and these are rotated in either direction for swinging the end of the car toward or away from the curb. The wheel segments are locked in inoperative position when not in use.

Other objects and advantages will appear as the specification proceeds, and the novel features will be particularly pointed out in the appended claims.

My invention is illustrated in the accompanying drawings, in which

Figure 1:
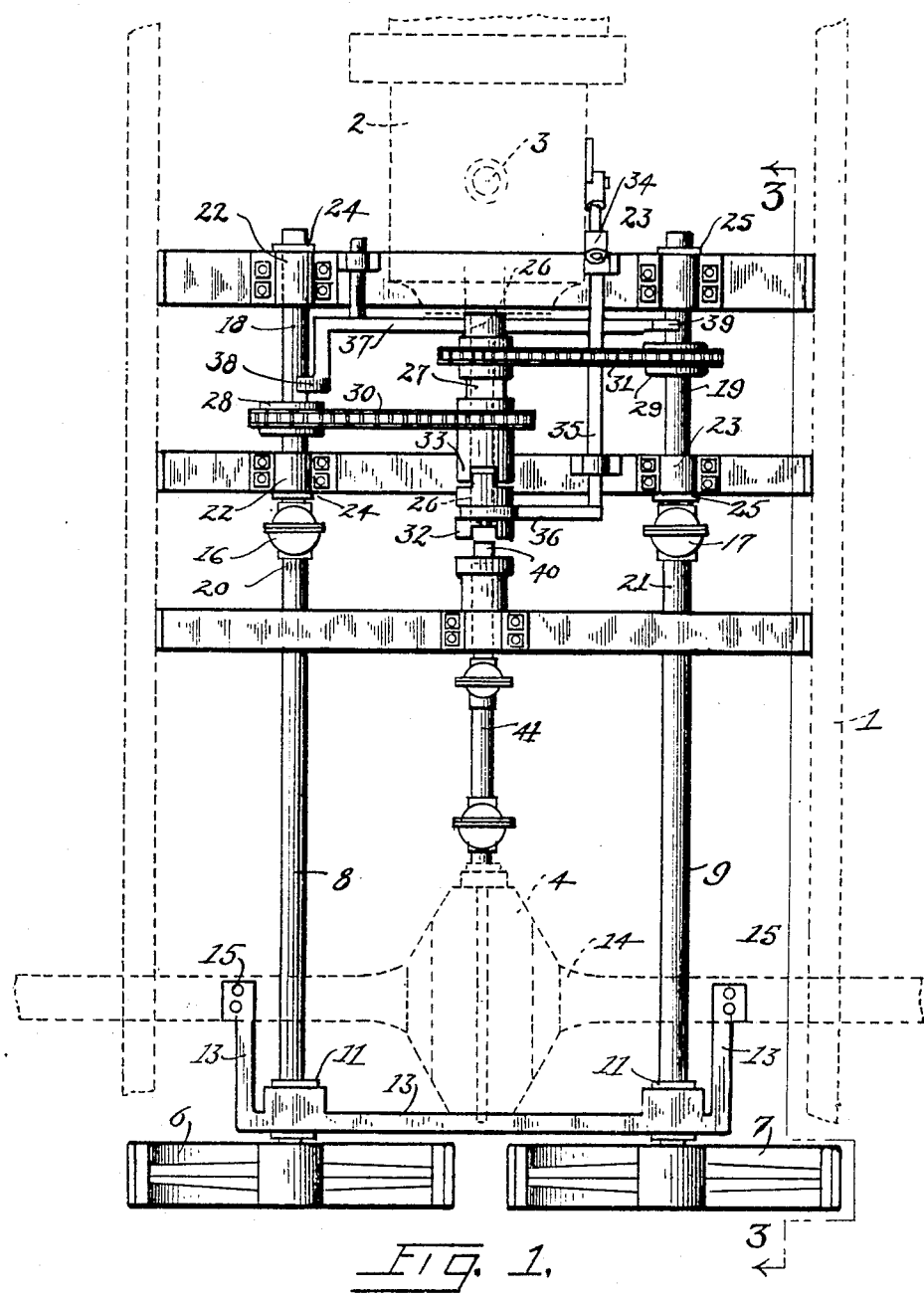
Figure 2:
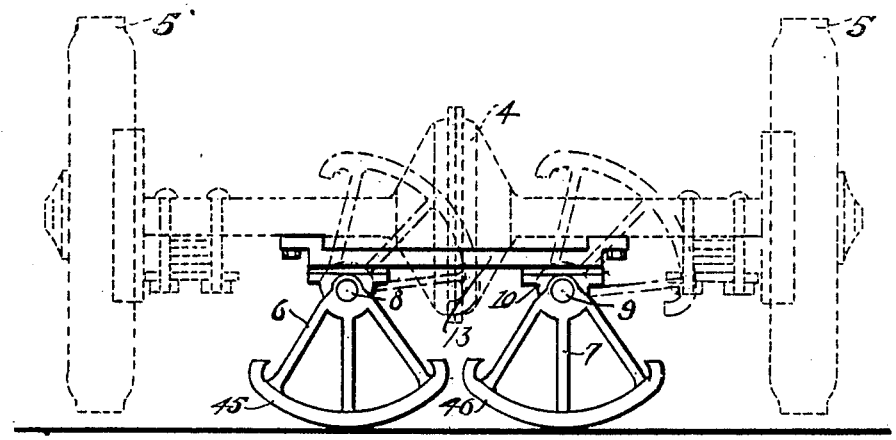
Figure 3:
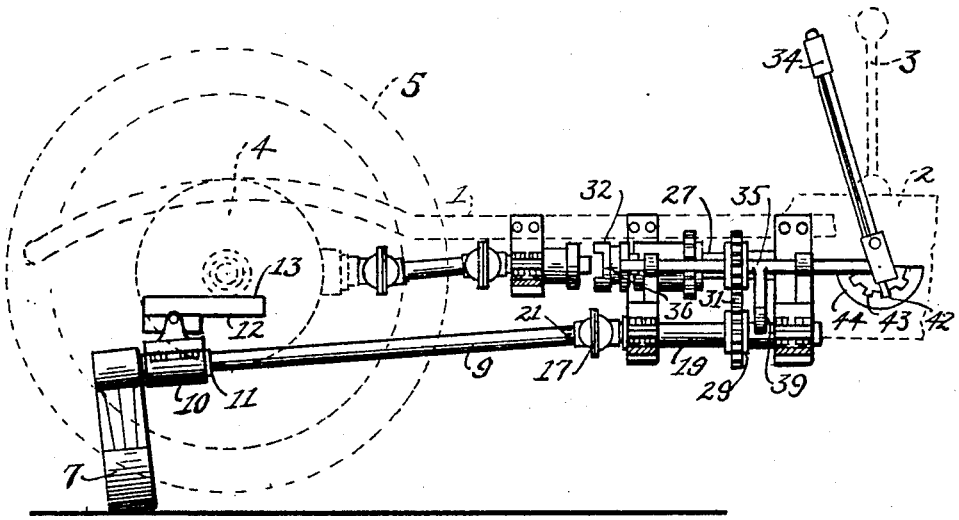

Figure 1 is a plan view of the device;
Figure 2 is an end elevation; and
Figure 3 is a section along line 3—3 of Figure 1.

In carrying out my invention, I make use of an automobile chassis 1, a transmission 2, a shifting lever 3, a differential 4, and rear wheels 5.

The device comprises two wheel segments 6 and 7 that extend transversely to the vehicle and are mounted on shafts 8 and 9. I have shown the segments 6 and 7 as being disposed at the rear of the car. They may be disposed at the front of the car if desired, or the shafts 8 and 9 may extend the entire length of the car and the wheel segments disposed at the front and also at the rear. The shafts 8 and 9 are mounted in bearings 10 and are provided with collars 11 for preventing longitudinal movement of the shafts. Figure 3 shows the bearings 10 as being pivotally secured at 12 to a frame 13. The frame is secured to the rear axle 14 of the automobile at 15 (see Figure 1).

The shafts 8 and 9 are connected by universal joints 16 and 17 to stub shafts 18 and 19. The shafts 8 and 9 are splined at 20 and 21 at points adjacent to the universal joints 16 and 17. This permits a slight longitudinal movement of the shafts 8 and 9 with respect to the universal joints 16 and 17, this movement being designed to permit a slight up and down swinging of the shafts 8 and 9 about their universal joints as centers. The shafts 18 and 19 are mounted in bearings 22 and 23, and are held in place by collars 24 and 25. I provide means for rotating the shafts 18 and 19 in either direction, this means connecting the shafts to a transmission shaft 26. This shaft is rotated in either direction, depending upon the position through which the gear shift lever 3 is shifted. Upon the shaft 26 I mount a double sprocket wheel 27. The shafts 18 and 19 carry sprocket wheels 28 and 29, and these are connected to the double sprocket wheel 27 by chains 30 and 31. A double clutch member 32 is splined on the shaft 26 and may be moved into engagement with a clutch-shaped end 33 on the double sprocket wheel 27. When this engagement is effected, the segments 6 and 7 are rotated in either direction, depending upon whether the clutch lever 3 is in reversed position or in low position.

I provide means for holding the segments 6 and 7 in raised position as shown by the dotted lines in Figure 2. The clutch 32 is thrown into engagement with the clutch 33 when a lever 34 (see Figure 3) is moved rearwardly. This lever pulls a bar 35 forwardly, and the latter carries a fork 36 that moves the clutch 32. When the lever 34 is moved in the opposite direction, it will disengage the clutch and will move a transverse arm 37 so that the latter will cause brake shoes 38 and 39 carried thereby to frictionally engage with the sides of the sprockets 28 and 29. This will prevent further rotation of the shafts 8 and 9, and will lock the segments 6 and 7 in raised position. The movement of the clutch 32 out of engagement with the clutch 33 moves it into engagement with a clutch 40 carried by the propeller shaft 41. This connects the rear wheels 5 with the transmission shaft 26, and the car can be used in the usual manner. The lever 34 is locked in either one of its two positions by a locking pin 42 (see Figure 3) that enters either one of two recesses 43 in a quadrant 44.

From the foregoing description of the various parts of the device, the operation thereof may be readily understood.

In parking automobiles, the nose of the car is headed toward the curb and then the lever 34 is actuated for connecting the segments 6 and 7 with the transmission shaft 26. This shaft is rotated in the desired direction for moving the rear end of the car toward the curb. The rims 45 and 46 of the segments 6 and 7 will gently lift the rear wheels 5 off from the ground and will move the end of the car transversely toward the curb. The segments 6 and 7 may be rotated through the desired number of revolutions for bringing the rear end of the car up against the curb.

In moving away from the curb, the segments 6 and 7 are rotated in the opposite direction until the rear end of the car is free from the car disposed directly behind it. The lever 34 may now be shifted for lowering the segments 5 and for swinging the segments 6 and 7 into inoperative position. The car is now backed until the front end is moved far enough away from the car in front to permit the turning of the car as it moves forwardly for freeing it from the car ahead. It is obvious that the device can be driven by the use of an electric motor deriving its power from the battery instead of being driven mechanically from the engine as is now the case.

Although I have shown and described one embodiment of my invention, it is to be understood that the same is susceptible of various changes, and I reserve the right to employ such changes as may come within the scope of the invention as claimed.

I claim:

1. A parking device for vehicles comprising wheel segments spaced from each other and extending transversely of the vehicle, the peripheral flanges of the segments having inwardly inclined cam portions designed to gradually raise the vehicle, and means for rotating the wheel segments for moving the vehicle laterally in a step-wise manner.

2. The combination with a vehicle, of a pair of shafts running longitudinally of the vehicle, wheel segments carried by each shaft and extending transversely of the vehicle, means for rotating the shafts in either direction so as to move the automobile laterally in a step-wise manner, and means for applying a braking force to the shafts for holding the segments in inoperative position.

3. A parking device for vehicles comprising a plurality of vehicle-lifting wheel segments rotatably carried by the vehicle and having peripheral flanges with inwardly inclined cam portions, said flanges being designed to gradually raise the vehicle and move it laterally a predetermined distance, and gently lower the vehicle onto the ground toward the end of the lateral excursion, these movements taking place during each rotation of the wheel segments so as to move the vehicle laterally step by step, and means for rotating the wheel segments for moving the vehicle in the desired direction.

PETER HEDSTROM.